June 14, 1960     A. GRIMAL     2,940,708
CAMERA TRIPOD
Filed Nov. 7, 1957     2 Sheets-Sheet 1
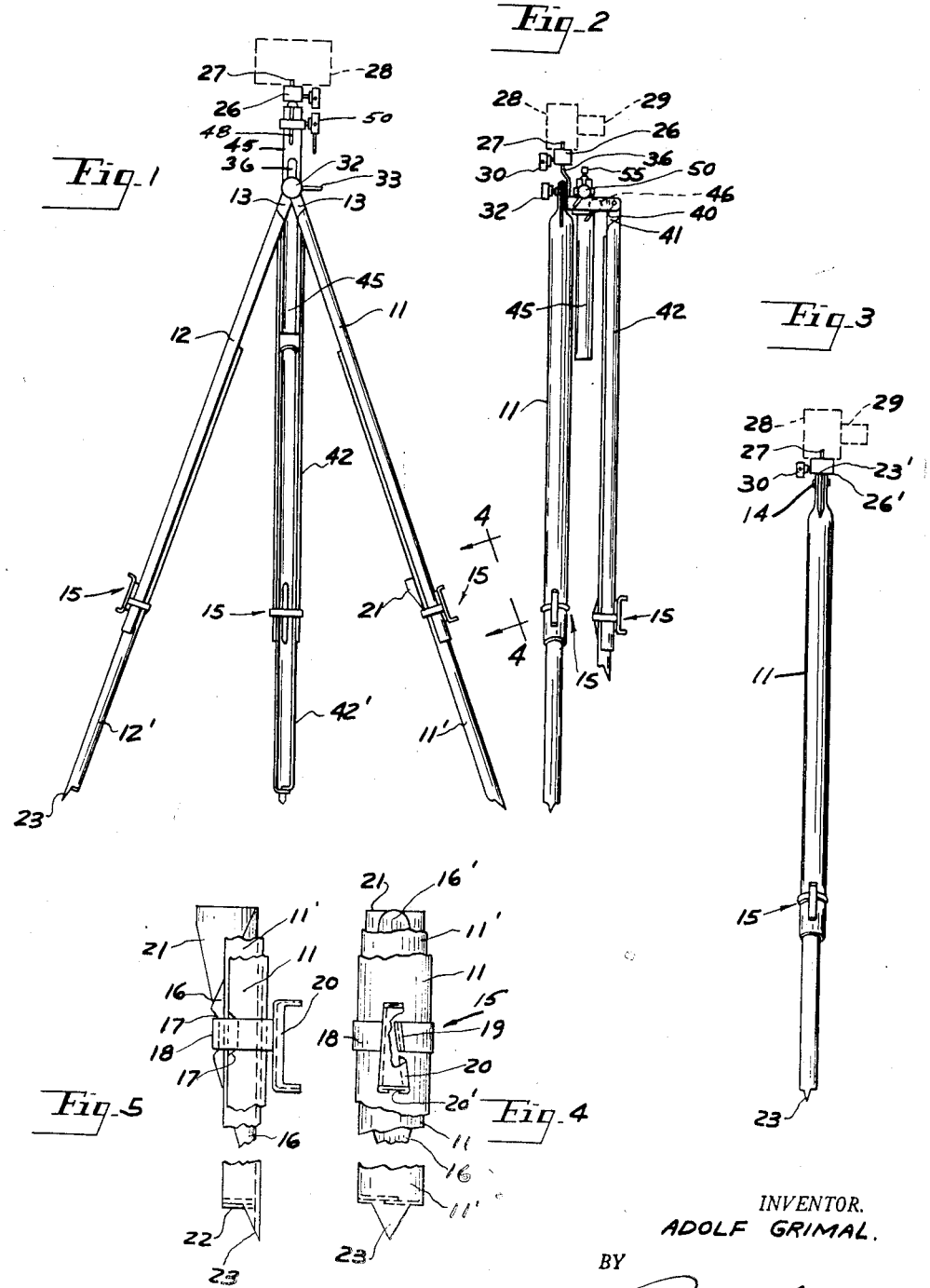
INVENTOR.
ADOLF GRIMAL.
BY
Robert A. Sloman
ATTORNEY June 14, 1960
A. GRIMAL
2,940,708
CAMERA TRIPOD
Filed Nov. 7, 1957
2 Sheets-Sheet 2
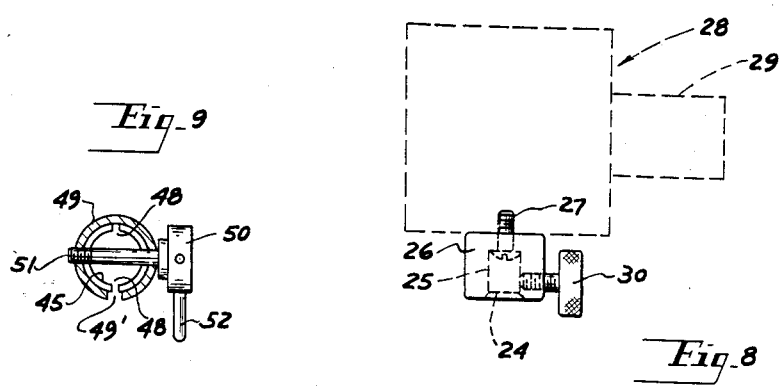
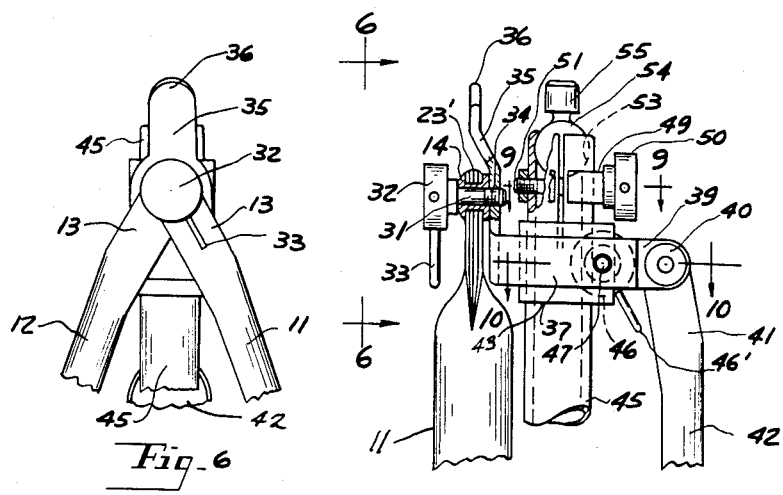
INVENTOR.
ADOLF GRIMAL
BY
Robert A. Sloman.
ATTORNEY United States Patent Office
2,940,708
Patented June 14, 1960

2,940,708
CAMERA TRIPOD
Adolf Grimal, 702 Oakley Park, Walled Lake, Mich.
Filed Nov. 7, 1957, Ser. No. 695,137
3 Claims. (Cl. 248—168)

This invention relates to bipods and tripods for cameras and more particularly to a combination bipod and tripod which may be used upon adjustment either as a bipod or as a tripod.

It is the object of the present invention to provide a bipod construction with a pair of telescoping legs snugly pivoted together at their upper flattened ends and to thus provide adaptor means for hand supporting a camera in a horizontal plane, and at the same time a simplified portable support of minimum weight and bulk.

It is another object of the present invention to provide a tripod construction including bracket means whereby the third leg may be removed from the tripod to thus produce a bipod construction.

It is a further object to provide in a tripod construction a vertically adjustable support carried thereby together with swivel mounting means for receiving a camera whereby it may be supported at any desired angle throughout 360 degrees.

It is a further object of this invention to provide in conjunction with said tripod novel means for regulating the vertical adjustment of the camera support.

It is another object herein to provide in a tripod construction a bracket extension and camera adaptor providing a quick mounting means for supporting a camera without reference to the vertical adjusting means.

It is a further object of the present invention to provide a novel telescoping leg construction for a tripod together with means for locking the telescoping leg in adjusted position.

It is still another object herein to provide a novel non-sink point for the lower ends of the telescoping legs.

These and other objects will be seen from the following specification and claims in conjunction with the appended drawings in which:

Fig. 1 is a front elevational view of the present tripod.

Fig. 2 is a side elevational view thereof with one of the tripod legs elevated from normal supporting position, used as a bipod.

Fig. 3 is a side elevational view of the device used as a bipod, center and one leg removed to lighten same.

Fig. 4 is a fragmentary view taken on line 4—4 of Fig 1, on an enlarged scale, illustrating the telescoping leg locking clamp.

Fig. 5 is a left side elevational view thereof.

Fig. 6 is a fragmentary view taken on line 6—6 of Fig. 7.

Fig. 7 is a fragmentary elevational view similar to Fig. 2, on an enlarged scale, and indicating the vertically adjustable camera mounting means.

Fig. 8 is a side elevational view of the mounting adapter secured on undersurface of a camera shown in phantom lines.

Fig. 9 is a section taken on line 9—9 of Fig. 7.

Fig. 10 is a section taken on line 10—10 of Fig. 7.

It will be understood that the above drawings illustrate a preferred embodiment of the invention and that other embodiments are contemplated within the scope of the claims hereafter set forth.

The present tripod construction consists of a pair of channeled or transversely arcuate legs 11 and 12 whose upper flattened ends 13 are transversely apertured and fixedly and pivotally interconnected by the permanent rivet 14, Fig. 7, to thereby define a bipod construction with the flattened ends 13 in frictional engaging relation. The tops of said upper ends are rounded as at 23', Fig. 3, to thereby define an adaptor means receivable within the countersunk opening 24, Fig. 8, in the camera adaptor 26 which countersunk opening joins the upright bore 25. Adaptor 26 is secured to the undersurface of camera 28 by fastening screw 27. The camera lens is shown at 29.

Fig. 3 illustrates the use of the present bipod with camera 28 with its adaptor 26 directly resting upon the adaptor mounting means 23' at the upper ends of legs 11 and 12.

The legs of the tripod are of a telescoping construction and including the similarly shaped extensions 11' and 12' which are adjustably retained in nested relationship with legs 11 and 12 by means of the hand clamps 15, Fig. 1, and Figs. 4 and 5.

In Figs. 4 and 5, the respective telescoping leg elements 11 and 11' are shown on an enlarged scale and there is nested within leg 11' the arcuate and tapered lock plate 16 whose lateral notches 17 register with corresponding notches 17 in portions of the leg elements 11 and 11' to cooperatively receive and retain the split clamp band 18.

The free ends of said band are reverse turned at 19, Fig. 4, defining a pair of tapered and spaced gripping elements or shoulders over which is adjustably positioned the tapered lock plate 20. Plate 20 includes upon its undersurface the reverse turned inwardly directed and tapered locking elements 20' which cooperatively interengage angled channels or shoulders 19 whereby transverse manual adjustment of plate 20 will draw the ends of band 18 towards each other for immovably securing the legs 11 and 11' in adjusted position.

As shown in Figs. 4 and 5, plate 16 of one leg has an arcuate extension 21 which extends laterally thereof and which is provided for the purpose of nestingly receiving the other telescoping leg 12 and 12' when the legs are brought together into parallel engaging relation for storage or carrying.

Each of the legs of the tripod have right angularly arranged inturned flanges 22 which are positioned above the tapered and pointed ends 23 of each of the legs to thereby provide in cooperation therewith non-sink points.

As best shown in Fig. 8, the camera adaptor 26 has a knob screw 30 adapted for retaining engagement with the camera mount 55 of Fig. 7. Mount 55 is adapted for positioning within the bore 25 of adaptor 26.

Referring to Fig. 7, screw shaft 31 extends through the rivet 14 and at one end has an enlarged knob 32 with handle 33 engageable with one end of rivet 14. The opposite threaded end 34 of screw 31 is threaded into upright bracket 35 for immovably securing the same. Said bracket provides for supporting means or the third leg 42 of the tripod and also the supporting means for the vertically adjustable camera support 45.

As shown in Figs. 6 and 7 bracket 35 at its upper end is rounded at 36 and may be used as shown in Fig. 2 providing a quick support for the camera 28 with end 36 of said bracket registering within the countersunk opening 24 in adaptor 26.

Below screw 31 bracket 35 terminates in the horizontally extending bifurcation 37 whose free inwardly directed ends 38 terminate in the parallel engaging members 39, Fig. 10, which are transversely apertured to receive rivet 40. The upper flattened end 41 of the third telescoping leg 42—42' is positioned between the bracket ends 39 and secured thereto by rivet 40.

Block 43 split at 44 is retained within bifurcation 37 of bracket 35 and has a vertical bore within which is positioned the vertically adjustable tube 45. This tube may be retained in adjusted position by the securing screw 47 which carries the enlarged head 46 and a handle 46'. Screw 47 extends through bifurcation 37 and the split ends of block 43.

The upper end of tube 45 is split upon its opposite sides at 48, Fig. 9, and above block 43 there is provided clamping band 49 which is split at 49' and which extends around the split upper end of tube 45. Transverse fastening screw 51 extends through corresponding openings in tube 45 and includes the enlarged head 50 with arm 52 by means of which the ball 54 may be secured in any adjusted position through 360 degrees within the upper end of tube 45.

For this purpose the upper end of tube 45 on its interior has a spherical recess 53 which cooperatively receives and provides a socket for ball 54 which carries the upright camera support 55. Support 55 is adapted for nesting and securing by knob screw 30 within bore 25 of camera adaptor 26 for use in the manner shown in Fig. 1.

Having described my invention, reference should now be had to the following claims:

1. In a camera tripod, a pair of telescoping legs pivotally connected in engaging relation at their upper ends, an upright arm removably secured to the pivotal connection of said legs, a bifurcated horizontally disposed support projecting from the lower end of said arm, an upright vertically adjustable tube secured within said support, there being a spherically shaped socket within the upper end of the tube, a ball nested in said socket for universal adjustment, means on said tube for securing said ball in adjusted position, a camera mounting means projecting above said ball adapted to supportably receive a camera mounting adaptor, the upper end of said arm being rounded providing an auxiliary support to receive a camera mounting adaptor, the adjustable securing of said tube consisting of a centrally apertured split block retained within said support slidably receiving said tube, and a locking bolt extending transversely through said support and the split portions of said block threadedly engaging a portion of said support, a third telescoping leg pivotally secured at its upper end to the end of said support, the mounting of said third leg consisting of a pair of opposed transversely apertured engaging extensions at the free ends of said support, the upper end of said third leg being flattened and interposed between said extensions, and a rivet pivotally connecting said extensions and flattened leg portion.

2. In a camera tripod, a pair of telescoping legs pivotally connected in engaging relation at their upper ends, an upright arm removably secured to the pivotal connection of said legs, a bifurcated horizontally disposed support projecting from the lower end of said arm, an upright vertically adjustable tube secured within said support, there being a spherically shaped socket within the upper end of the tube, a ball nested in said socket for universal adjustment, means on said tube for securing said ball in adjusted position, a camera mounting means projecting above said ball adapted to supportably receive a camera mounting adaptor, the upper end of said arm being rounded providing an auxiliary support to receive a camera mounting adaptor, the upper end of said tube being longitudinally slit, said ball securing means including a split band encircling the split end of the tube below and adjacent said ball, a locking bolt extending through said band and tube threadedly engaging a portion of said band, a third telescoping leg pivotally secured at its upper end to the end of said support, the mounting of said third leg consisting of a pair of opposed transversely apertured engaging extensions at the free ends of said support, the upper end of said third leg being flattened and interposed between said extensions, and a rivet pivotally connecting said extensions and flattened leg portion.

3. In a camera tripod, a pair of telescoping legs pivotally connected in engaging relation at their upper ends, an upright arm removably secured to the pivotal connection of said legs, a bifurcated horizontally disposed support projecting from the lower end of said arm, an upright vertically adjustable tube secured within said support, there being a spherically shaped socket within the upper end of the tube, a ball nested in said socket for universal adjustment, means on said tube for securing said ball in adjusted position, a camera mounting means projecting above said ball adapted to supportably receive a camera mounting adaptor, the upper end of said arm being rounded providing an auxiliary support to receive a camera mounting adaptor, the adjustable securing of said tube consisting of a centrally apertured split block retained within said support slidably receiving said tube, and a locking bolt extending transversely through said support and the split portions of said block threadedly engaging a portion of said support, the upper end of said tube being longitudinally slit, said ball securing means including a split band encircling the split end of the tube below and adjacent said ball, a locking bolt extending through said band and tube threadedly engaging a portion of said band, a third telescoping leg pivotally secured at its upper end to the end of said support, the mounting of said third leg consisting of a pair of opposed transversely apertured engaging extensions at the free ends of said support, the upper end of said third leg being flattened and interposed between said extensions, and a rivet pivotally connecting said extensions and flattened leg portion.

References Cited in the file of this patent
UNITED STATES PATENTS

| | | |
|---|---|---|
| 964,381 | Boyd | July 12, 1910 |
| 1,324,934 | Shand | Dec. 16, 1919 |
| 1,566,953 | Becker | Dec. 22, 1925 |
| 1,863,761 | Neuwirth | June 21, 1932 |
| 2,545,699 | Johannsen | Mar. 20, 1951 |

FOREIGN PATENTS

| | | |
|---|---|---|
| 5,680 | Great Britain | Mar. 8, 1904 |
| 292,576 | Italy | Jan. 23, 1932 |
| 1,082,788 | France | June 23, 1954 |